(12) United States Patent
Wang et al.

(10) Patent No.: US 8,589,025 B2
(45) Date of Patent: Nov. 19, 2013

(54) TIRE CORNERING POWER ON-BOARD ESTIMATION AND MONITORING USING STEERING MOMENT

(75) Inventors: Dexin Wang, Livonia, MI (US); Rena Hecht Basch, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/620,637

(22) Filed: Sep. 14, 2012

(65) Prior Publication Data

US 2013/0013143 A1   Jan. 10, 2013

Related U.S. Application Data

(63) Continuation of application No. 12/109,482, filed on Apr. 25, 2008, now Pat. No. 8,290,662.

(51) Int. Cl.
*G06F 7/00* (2006.01)

(52) U.S. Cl.
USPC ............. 701/36; 701/37; 701/41; 702/182; 702/183; 73/146.2

(58) Field of Classification Search
USPC ............. 701/29.1, 36, 72, 41; 702/182–183; 73/146, 146.2; 340/442
See application file for complete search history.

(56) References Cited

U.S. PATENT DOCUMENTS

| | | | |
|---|---|---|---|
| 5,712,616 A * | 1/1998 | Schmitt et al. | 340/442 |
| 6,253,123 B1 * | 6/2001 | Schramm et al. | 701/1 |
| 6,313,742 B1 * | 11/2001 | Larson | 340/442 |
| 6,834,222 B2 * | 12/2004 | Lu et al. | 701/36 |
| 6,892,123 B2 * | 5/2005 | Hac | 701/48 |
| 6,895,317 B2 * | 5/2005 | Yasui et al. | 701/36 |
| 6,931,313 B2 | 8/2005 | Kato et al. | |
| 6,984,003 B2 | 1/2006 | Kogure et al. | |
| 6,993,449 B2 * | 1/2006 | Koebe et al. | 702/138 |
| 7,184,868 B2 | 2/2007 | Matsunaga et al. | |
| 7,292,924 B2 * | 11/2007 | Milot | 701/70 |
| 7,502,676 B2 * | 3/2009 | Ono et al. | 701/41 |
| 7,600,762 B2 * | 10/2009 | Yasui et al. | 280/5.51 |
| 7,762,580 B2 * | 7/2010 | Breed | 280/730.2 |
| 2002/0032513 A1 * | 3/2002 | Faye | 701/93 |
| 2002/0157461 A1 * | 10/2002 | Schmidt et al. | 73/146 |
| 2003/0051560 A1 * | 3/2003 | Ono et al. | 73/862.08 |
| 2003/0058118 A1 * | 3/2003 | Wilson | 340/679 |

(Continued)

OTHER PUBLICATIONS

Office Action dated Mar. 8, 2012 issued in Chinese Application No. 200910135526.X.

(Continued)

*Primary Examiner* — Rami Khatib
(74) *Attorney, Agent, or Firm* — O'Brien Jones PLLC; Ray Coppiellie

(57) ABSTRACT

A tire cornering power estimation and monitoring system may include a steering torque sensor, a steering wheel angle sensor, a yaw rate sensor, a lateral acceleration sensor, and a speed sensor. The system may further include at least one controller configured to receive signals from the steering torque sensor, steering wheel angle sensor, yaw rate sensor, lateral acceleration sensor, and speed sensor and send a notification if the signals indicate that one or more of the vehicle's tires need to be checked or serviced. The system may further include a notification system configured to receive a signal from the controller and indicate that one or more of the vehicle's tires need to be checked or serviced.

12 Claims, 2 Drawing Sheets

(56) References Cited

U.S. PATENT DOCUMENTS

| | | | |
|---|---|---|---|
| 2003/0172728 A1* | 9/2003 | Gustafsson et al. | 73/146 |
| 2004/0133330 A1* | 7/2004 | Ono et al. | 701/80 |
| 2004/0225423 A1* | 11/2004 | Carlson et al. | 701/36 |
| 2005/0055149 A1* | 3/2005 | Kato et al. | 701/80 |
| 2005/0182575 A1* | 8/2005 | Kwasny et al. | 702/41 |
| 2005/0205339 A1* | 9/2005 | Aizawa et al. | 180/443 |
| 2008/0109134 A1* | 5/2008 | Bolourchi et al. | 701/41 |
| 2010/0174437 A1* | 7/2010 | Benedict et al. | 701/29 |
| 2010/0217471 A1* | 8/2010 | Stenman et al. | 701/29 |

OTHER PUBLICATIONS

Office Action dated Aug. 30, 2012 issued in Chinese Application No. 200910135526.X.

Office Action dated Nov. 15, 2010 from co-pending U.S. Appl. No. 12/109,482.

Office Action dated Mar. 14, 2011 from co-pending U.S. Appl. No. 12/109,482.

Response to Office Action dated Dec. 30, 2010 from co-pending U.S. Appl. No. 12/109,482.

Response to Office Action dated Mar. 28, 2011 from co-pending U.S. Appl. No. 12/109,482.

* cited by examiner

TIRE CORNERING POWER ON-BOARD ESTIMATION AND MONITORING USING STEERING MOMENT

CROSS-REFERENCE TO RELATED APPLICATION

This patent application is a continuation application of U.S. patent application Ser. No. 12/109,482, filed on Apr. 25, 2008, which is incorporated by reference herein in its entirety.

FIELD OF THE INVENTION

The present invention relates generally to a system and method for estimating and monitoring tire cornering power that can provide improved on-board vehicle dynamics and stability control, and can provide drivers with information regarding tire physical conditions.

BACKGROUND OF THE INVENTION

The motion of a vehicle is governed by the forces generated between its tires and the road (e.g., lateral tire forces). It is, therefore, advantageous for vehicle control systems, which enhance vehicle handling and increase passenger safety, to have knowledge of lateral tire force characteristics and adapt to road conditions accordingly. To meet increasing industry standards and heightened consumer expectations regarding vehicle safety, vehicle control systems should adapt to road conditions as well as vehicle conditions. To adapt to vehicle conditions, vehicle control systems can monitor parameters such as steering input, vehicle loading, and tire cornering power.

Tire cornering power, otherwise known as tire cornering stiffness or effective aligning stiffness, is a tire parameter that affects vehicle steering, handling and stability. Tire cornering power can be defined by the relationship between tire lateral forces and tire slip, and depends upon factors such as steering input and road conditions, as well as vehicle conditions such as vehicle loading, tire tread wear, tire damage, and tire inflation pressure.

Tire cornering power estimation and monitoring have not been incorporated into existing vehicle control systems due to various limitations in existing estimation methods. Known estimation methods, which typically estimate tire forces using accelerations or vehicle speed with a steady-state assumption, can be non-robust or inaccurate. Additional estimation methods, which suggest use of Global Positioning System (GPS) and Inertial Navigation System (INS) sensors to estimate a vehicle's tire cornering stiffness using a sideslip estimate to find tire slip angle, can be both impractical and costly due to a need for additional sensors on the vehicle.

SUMMARY OF THE INVENTION

In accordance with certain embodiments of the present teachings, the present invention additionally provides a tire cornering power estimation and monitoring system, comprising a steering torque sensor, a steering wheel angle sensor, a yaw rate sensor, a lateral acceleration sensor, a speed sensor, and at least one controller configured to receive signals from the sensors, steering wheel angle sensors and send a notification if the signals indicate that one or more of the vehicle's tires need to be checked or serviced. The system also comprises a notification system configured to indicate that one or more of the vehicle's tires need to be checked or serviced.

In accordance with certain embodiments of the present teachings, the present invention provides a method for estimating and monitoring tire cornering power in a vehicle, comprising receiving signals corresponding to a steering torque, a steering wheel angle, a yaw rate, a lateral acceleration, and a speed, and sending a notification if the signals indicate that one or more of the vehicle's tires need to be checked or serviced.

Certain embodiments of the present teachings also provide a method for estimating and monitoring tire cornering power in a vehicle, comprising estimating a front effective aligning stiffness based on at least a change in front total steering moment and a change in front average tire slip angle, comparing the estimated front effective aligning stiffness with a reference front aligning stiffness to determine a tire cornering stiffness deviation, and providing feedback when the current tire cornering stiffness deviation exceeds a specified value.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate embodiments of the invention and together with the description, serve to explain the principles of the invention.

BRIEF DESCRIPTION OF THE DRAWINGS

At least some features and advantages will be apparent from the following detailed description of embodiments consistent therewith, which description should be considered with reference to the accompanying drawings, wherein.

Although the following detailed description makes reference to illustrative embodiments, many alternatives, modifications, and variations thereof will be apparent to those skilled in the art. Accordingly, it is intended that the claimed subject matter be viewed broadly.

DESCRIPTION OF THE EMBODIMENTS

Reference will now be made in detail to various embodiments, examples of which are illustrated in the accompanying drawings. The various exemplary embodiments are not intended to limit the disclosure. To the contrary, the disclosure is intended to cover alternatives, modifications, and equivalents.

The incorporation of robust tire cornering stiffness estimation into vehicle control systems can improve vehicle dynamics and stability control. In addition, monitoring tire cornering power against reference stiffness values will provide drivers with critical information for timely tire inspection and/or replacement.

To enable dynamic determination of a vehicle's front effective aligning stiffness, exemplary embodiments of the present teachings contemplate using one or more sensors to provide signals to a system controller that utilizes the signals to estimate the front effective aligning stiffness. The one or more sensors may include existing vehicle sensors when available, such as, for example, Electric Power Assisted Steering (EPAS) sensors, yaw rate sensors, lateral acceleration sensors, speed sensors, or a combination thereof. Because most existing vehicles already contain the above sensors, certain embodiments of the present teachings contemplate using only existing sensors. Embodiments of the present teachings also contemplate a system including additional sensors as needed to provide the signal inputs used in the system and method of the present teachings.

Figure 1:
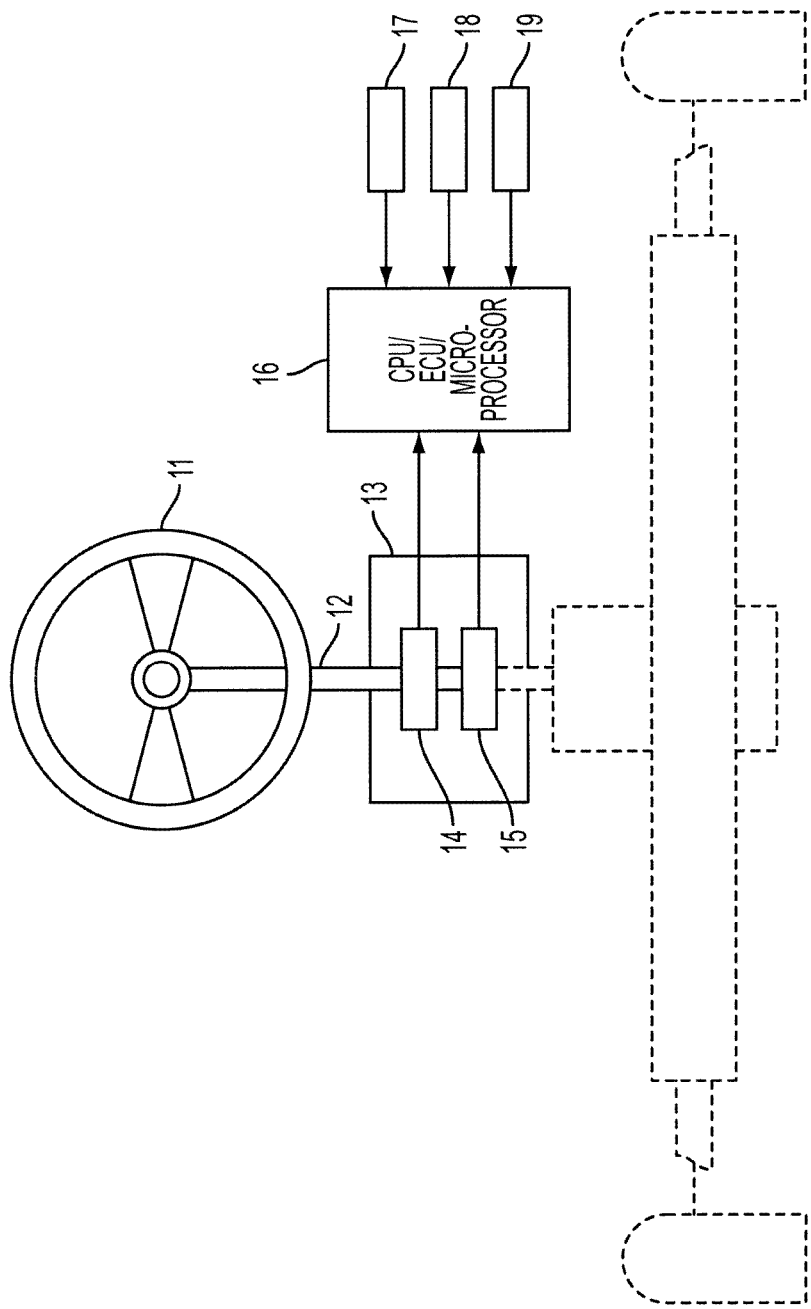
FIG. 1 is a schematic diagram showing some structural elements of an on-board tire cornering power estimation and monitoring system in accordance with exemplary embodiments of the present teachings.

FIG. 1 shows the structure of an exemplary embodiment of a tire cornering power estimation and monitoring system in accordance with the present teachings, which utilizes existing on-board sensors for vehicle dynamics control. An Electronic Power Assisted Steering (EPAS) system 13 contains a steering torque sensor 14 and a steering wheel angle sensor 15. The torque measured by the EPAS steering torque sensor 14 is the torque applied by the driver when rotating a steering wheel 11 and is measured at a steering column 12. The measured torque is used to determine the amount of power assist torque applied by the EPAS system, as well as the front tire aligning torque needed to bring the wheels and steering back into alignment while the vehicle is in motion.

A controller 16 is configured to receive signals from steering torque sensor 14, steering wheel angle sensor 15, a vehicle yaw rate sensor 17, a vehicle lateral acceleration sensor 18, and a vehicle speed sensor 19. Controller 16 is configured to estimate a front effective aligning stiffness based on the signals received from sensors 14, 15, 17, 18, and 19, as set forth in the following exemplary embodiments. The controller may include, for example, an existing vehicle controller such as a stability controller or a dedicated controller, or control may be distributed among more than one vehicle controller, as would be understood by one skilled in the art.

Vehicle front effective aligning stiffness is defined as the change in the total front steering moment over the change in front average tire slip angle, which can also be represented as a ratio of front aligning torque (effort) to tire slip angle (deformation). The variable changes can be determined in a time interval that is justified for small tire slip angles when the force-slip relationship is either linear or moderately non-linear. In the present teachings, the front effective aligning stiffness is referred to as the maximum front tire aligning stiffness defined at zero tire slip. The aligning stiffness decreases when tire slip increases. The rate of decrease is road friction dependent.

In accordance with certain embodiments of the present teachings, the total front steering moment ($\Delta M$) can be determined by the controller 16 using a kinematic relationship based on the steering torque. It is a torque change within a time interval, as received, for example, from a steering torque sensor 14 in an EPAS system 13.

In accordance with certain embodiments of the present teachings, a change in front tire slip angle ($\Delta \alpha$) is determined from front tire steering angle ($\delta$), yaw rate ($\dot{\phi}$), lateral acceleration ($a_y$), and speed (V) in straightforward arithmetic and integral calculations performed, for example, by the controller 16 as represented by the below equation:

$$\Delta \alpha = \Delta \delta - \frac{l_f}{V}\Delta \dot{\phi} - \int_{t}^{t+\Delta t}\left(57.3 a_y V_x^{-1} - \dot{\phi}\right) dt \quad (1)$$

Vehicle yaw rate $\dot{\phi}$, lateral acceleration $a_y$, and speed V can be measured by sensors 17, 18, and 19 respectively, and front tire steering angle can be derived from a signal from steering wheel angle sensor 15 of EPAS system 13. To complete the calculation, $57.3 a_y$ is a unit conversion from radians to degrees (180/3.14159) and $l_f$ is a center of gravity position. The present teachings also assume that a mechanism for detecting and removing sensor drift is present in the vehicle. Sensor drift can adversely affect the performance of any controllers that depend upon the above sensors.

Certain embodiments of the present teachings contemplate using a tire slip angle equation that provides an integral tire slip angle ($\Delta \alpha$), and not an absolute tire slip angle ($\alpha$) for small tire slip when tire lateral force and self-aligning moment are linear in slip. Using an integral can make the value less sensitive to noise (e.g., from vehicle acceleration) and therefore generally more reliable. An absolute tire slip angle ($\alpha$) provides additional information to improve the stiffness estimation in nonlinear tire force-slip range. In certain embodiments of the present invention, the integral front tire slip angle ($\Delta \alpha$) calculation can be further improved by adding a vehicle lateral acceleration prediction model to the system to compare with the readings from the vehicle lateral acceleration sensor(s) and minimize or eliminate noise or error from vehicle lateral acceleration or yaw rate sensors.

In certain embodiments of the present teachings, front effective or estimated aligning stiffness ($A_{s,m}$) can be estimated by the controller 16 using the total front steering moment ($\Delta M$) and the previously determined front tire slip angle ($\Delta \alpha$) in the following equation:

$$\Delta M = A_{s,m}(1 - A_{s,m}|\epsilon_1 \alpha| + A_{s,m}^2 \epsilon_2 \alpha^2 - A_{s,m}^3 \epsilon_3 \alpha^3|)\Delta \alpha \quad (2)$$

Using, for example, a non-linear least-square approach, the absolute tire slip angle ($\alpha$) used in the above estimation can be determined with the following equation:

$$\alpha = \alpha_0 + \Sigma \Delta \alpha \quad (3)$$

As a result, vehicle body side slip, generally used to determine front tire slip angle ($\alpha$), is obtained as well. To complete the front effective aligning stiffness estimation, estimated road friction ($\mu$) and estimated vehicle front weight ($F_z$) are input into an assumed tire model to obtain predetermined tire model coefficients $\epsilon_1$, $\epsilon_2$, and $\epsilon_3$. In addition to tire parameters in the model, the model can use tire slip, friction, and tire normal load (or weight) to determine coefficients $\epsilon_1$, $\epsilon_2$, and $\epsilon_3$.

The present teachings contemplate using any known suitable methods to estimate road friction and vehicle front weight. Embodiments of the present teachings contemplate using a known model such as, for example, a tire brush model to estimate a road friction coefficient. Although the present teachings assume availability of road friction information, estimated road friction can be obtained through any known suitable method, including methods that may require information from additional vehicle sensors in order to estimate road friction. Accordingly, the above-disclosed sensors are the minimal set of sensors required for tire cornering power estimation.

The controller 16 can then compare the estimated front effective aligning stiffness ($A_{s,m}$) with a known reference aligning stiffness to determine a deviation between the two values. The reference aligning stiffness can be determined, for example, in a laboratory from known reference tire lateral cornering and aligning stiffness values for given tire normal forces. In certain embodiments of the present teachings, a separate set of reference values can be determined for each tire size on each type of vehicle. Ideally, with the same loading conditions and the same tire physical conditions, the estimated front effective aligning stiffness and the reference aligning stiffness are the same. In such a case, tire cornering stiffness deviation results from changes in tire wear and other physical tire conditions. In certain embodiments of the present teachings, the reference aligning stiffness values are dynamically updated based upon vehicle conditions. In other embodiments, they remain the same unless purposefully updated. The controller 16 monitors the estimated front aligning stiffness values and compares them to the reference aligning stiffness values to determine resulting tire cornering stiffness deviation values, and can notify a driver if a deviation value exceeds a specified value, indicating, for example, that one or more of the vehicle's tires need to be checked and/or serviced (for example because one or more tires are worn and need to be replaced). A change in tire cornering power can be caused by multiple factors such as, for example, tire wear, aging, potential damage, and low tire pressure.

The present teachings contemplate using a notification system to alert a driver that one or more of a vehicle's tires need to be checked and/or serviced. The notification system can audibly and/or visually indicate to the driver that one or more tires need to be checked and/or serviced. The notification system can include, for example, an indicator light or LCD that is displayed on the vehicle's console, rearview mirror, or other location noticeable to a driver. The indicator light or LCD can be, for example, constant or blinking, can be displayed only at startup or displayed continuously throughout the vehicle's use, and can be accompanied by a sound to further aid in alerting the driver to the tire condition. The teachings further contemplate a notification system that also or alternatively alerts a dealer or mechanic that one or more of a vehicle's tires need to be checked and/or serviced. With this information, the service provider can contact the vehicle's owner regarding the need for a tire check, or suggest tire inspection the next time the vehicle is in for service. The notification system can be, for example, wireless within the vehicle and/or between the vehicle and the service provider.

Table 1 illustrates a comparison of exemplary simulated estimated and reference front effective aligning stiffness values for the same tire conditions. It demonstrates that the present teachings work effectively for estimating aligning stiffness in both a tire force linear range and a non-linear range. Because the actual values and the values estimated using the teachings of an embodiment of the present invention are sufficiently similar, the teachings of the present invention are confirmed to work effectively to estimate aligning stiffness for comparison. The estimated aligning stiffness of Table 1 was obtained using simulated vehicle variables for steering torque, steering wheel angle, yaw rate, lateral acceleration, and speed. The reference aligning stiffness was obtained from the calculation: (front cornering stiffness) (kinematic tail)+ (front self aligning stiffness).

TABLE 1

Comparison of Estimated and Reference Aligning Stiffness Using Simulated Vehicle Variables

| Time segment | Tire Normal Force (N) | | Reference Aligning Stiffness (N-m/deg) | Estimated Aligning Stiffness (N-m/deg) |
|---|---|---|---|---|
| I (1 s) | 6902 | 6383 | 238.9 | 225.9 |
| II (0.6 s) | 7149 | 6136 | 238.2 | 224.3 |

TABLE 1-continued

Comparison of Estimated and Reference Aligning Stiffness Using Simulated Vehicle Variables

| Time segment | Tire Normal Force (N) | | Reference Aligning Stiffness (N-m/deg) | Estimated Aligning Stiffness (N-m/deg) |
|---|---|---|---|---|
| III (1.2 s) | 6349 | 6936 | 237.8 | 214.8 |
| IV (0.8 s) | 6189 | 7095 | 238.1 | 234.4 |

The data in the table also shows that the reference aligning stiffness is insensitive to tire normal force changes for small tire slip, as the stiffness changes due to the tire normal force transfer on left and right sides are complementary.

Figure 2:
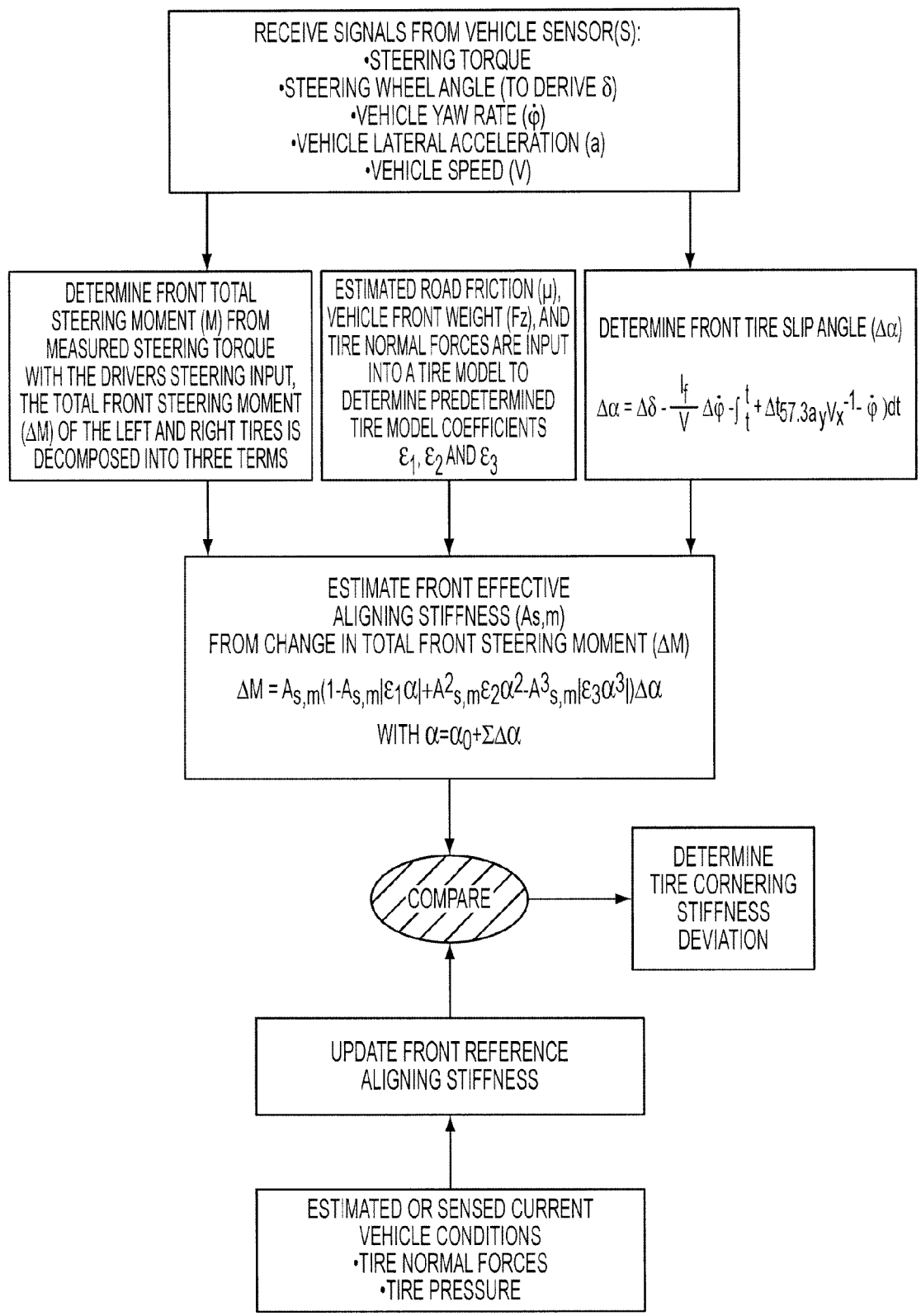
FIG. 2 is a logic flow diagram for estimating and monitoring tire cornering power in accordance with exemplary embodiments of the present teachings.

FIG. 2 shows a high-level logic flow diagram depicting an exemplary embodiment of a method of estimating and monitoring tire cornering power in accordance with the present teachings. In FIG. 2, signals are received from one or more sensors. The signals correspond to one or more operating conditions of a vehicle, such as, for example, steering torque and steering wheel angle from an EPAS system, yaw rate, lateral acceleration, and speed. A change in front total steering moment ($\Delta M$) is calculated from the measured steering torque; and a change in front tire slip angle ($\Delta \alpha$) is calculated from a steering wheel angle, a yaw rate, a lateral acceleration, and a vehicle speed, utilizing equation (1). Front effective aligning stiffness ($A_{s,m}$) is estimated from a change in steering moment $\Delta M$, which is calculated using $\Delta \alpha$ and predetermined tire model functions $\epsilon_1$, $\epsilon_2$, and $\epsilon_3$, utilizing equations (2) and (3). The estimated front effective aligning stiffness ($A_{s,m}$) is compared to a reference front aligning stiffness that can be predetermined or dynamically updated based upon current vehicle conditions, to determine a tire cornering stiffness deviation from the reference front aligning stiffness values.

Certain embodiments of the present invention check the accuracy of the vehicle signals used to estimate front effective aligning stiffness prior to performing calculations based on those signals. An accuracy check helps to ensure that the sensors are not malfunctioning or reacting to roadway conditions, such as, for example, when one tire is slipping on ice or mud.

Because tires can be the part in vehicle dynamics afflicted with the highest degree of non-linearity due to saturation and uncertainty due to weather conditions, certain embodiments of the present invention also provide for a more robust estimate of front effective aligning stiffness that works even with a non-linear tire slip. Front effective aligning stiffness can be represented as a ratio of front aligning torque to tire slip angle. Thus, as tire slip angle (the denominator) decreases, aligning stiffness increases. Accordingly, to provide for non-linearity, embodiments of the present teachings determine a maximum front effective aligning stiffness from a recursive improved estimate of the front effective aligning stiffness through multiple estimates over short periods of time. The maximum front effective aligning stiffness is the highest estimated stiffness that arises from a current set of tire conditions, and is compared with the reference front aligning stiffness to determine the tire cornering stiffness deviation.

The present teachings contemplate monitoring the tire cornering stiffness deviation values, and alerting a driver (or other suitable person such as a dealer or mechanic) if a deviation exceeds a specified value, indicating, for example, that one or more of the vehicle's tires need to be checked and/or serviced. Certain embodiments of the present teachings monitor tire cornering stiffness only during periods of vehicle cornering or turning. The existence of vehicle cornering can be determined, for example, by yaw rate and steering wheel angle.

While the present invention has been disclosed in terms of exemplary embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims. The present teachings as disclosed work equally well for front, rear, and four-wheel drive vehicles, being independent of vehicle drive type.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A tire cornering power estimation and monitoring system, comprising:
    a steering torque sensor, a steering wheel angle sensor, a yaw rate sensor, a lateral acceleration sensor, and a speed sensor;
    at least one controller configured to receive signals from the steering torque sensor, steering wheel angle sensor, yaw rate sensor, lateral acceleration sensor, and speed sensor and to estimate a front effective aligning stiffness based on at least one of the received signals, wherein the controller is further configured to compare the estimated front effective aligning stiffness to a reference front aligning stiffness and to send a notification if the comparison indicates that one or more of the vehicle's tires need to be checked or serviced; and
    a notification system configured to receive a signal from the controller and indicate that one or more of the vehicle's tires need to be checked or serviced.

2. The tire cornering power estimation and monitoring system of claim 1, wherein the controller is further configured to estimate the front effective aligning stiffness based in part on a front total steering moment, and wherein the controller is further configured to determine the front total steering moment based on at least one of the signals received from the steering torque sensor, steering wheel angle sensor, yaw rate sensor, lateral acceleration sensor, and speed sensor.

3. The tire cornering power estimation and monitoring system of claim 2, wherein the controller is further configured to estimate the front effective aligning stiffness based in part on a front tire slip angle, and wherein the controller is further configured to determine the front tire slip angle based on at least one of the signals received from the steering torque sensor, steering wheel angle sensor, yaw rate sensor, lateral acceleration sensor, and speed sensor.

4. The tire cornering power estimation and monitoring system of claim 1, wherein the reference front aligning stiffness is dynamically updated based upon vehicle conditions.

5. The tire cornering power estimation and monitoring system of claim 1, wherein the controller is further configured to determine a tire corner stiffness deviation based on the comparison of the estimated vehicle front effective aligning stiffness to the reference vehicle front effective aligning stiffness.

6. The tire cornering power estimation and monitoring system of claim 5, wherein the notification system is configured to provide feedback to a vehicle driver when the tire cornering stiffness deviation exceeds a specified value.

7. The tire cornering power estimation and monitoring system of claim 1, wherein the feedback to the vehicle driver is current tire physical condition feedback.

8. A tire cornering power estimation and monitoring system, comprising:
    a steering torque sensor, a steering wheel angle sensor, a yaw rate sensor, a lateral acceleration sensor, and a speed sensor;
    at least one controller configured to receive signals from the steering torque sensor, steering wheel angle sensor, yaw rate sensor, lateral acceleration sensor, and speed sensor and send a notification if the signals indicate that one or more of the vehicle's tires need to be checked or serviced; and
    a notification system configured to receive a signal from the controller and indicate that one or more of the vehicle's tires need to be checked or serviced;
    wherein the controller is configured to determine a front total steering moment based on at least one of the signals received from the steering torque sensor, steering wheel angle sensor, yaw rate sensor, lateral acceleration sensor, and speed sensor;
    wherein the controller is configured to determine a front tire slip angle based on at least one of the signals received from the steering torque sensor, steering wheel angle sensor, yaw rate sensor, lateral acceleration sensor, and speed sensor; and
    wherein the controller is configured to estimate a front effective aligning stiffness based on the front total steering moment and the front tire slip angle.

9. The tire cornering power estimation and monitoring system of claim 8, wherein the controller is configured to compare the estimated front effective aligning stiffness with a reference front aligning stiffness to determine a tire cornering stiffness deviation.

10. The tire cornering power estimation and monitoring system of claim 9, wherein the reference front aligning stiffness is dynamically updated based upon vehicle conditions.

11. The tire cornering power estimation and monitoring system of claim 10, wherein the notification system is configured to provide feedback to a vehicle driver when the tire cornering stiffness deviation exceeds a specified value.

12. The tire cornering power estimation and monitoring system of claim 11, wherein the feedback to the vehicle driver is current tire physical condition feedback.

* * * * *